(12) United States Patent
Perry

(10) Patent No.: US 9,746,080 B2
(45) Date of Patent: Aug. 29, 2017

(54) HIGH PRESSURE SEAL ASSEMBLY FOR A MOVEABLE SHAFT

(71) Applicant: APS Technology, Inc., Wallingford, CT (US)

(72) Inventor: Carl Allison Perry, Middletown, CT (US)

(73) Assignee: APS TECHNOLOGY, INC., Wallingford, CT (US)

(*) Notice: Subject to any disclaimer, the term of this patent is extended or adjusted under 35 U.S.C. 154(b) by 0 days.

(21) Appl. No.: 14/529,899

(22) Filed: Oct. 31, 2014

(65) Prior Publication Data

US 2016/0123469 A1    May 5, 2016

(51) Int. Cl.
| F16J 15/3208 | (2016.01) |
| F16J 15/3204 | (2016.01) |
| F16J 15/3212 | (2016.01) |
| F16J 15/3236 | (2016.01) |
| F16F 1/00 | (2006.01) |

(52) U.S. Cl.
CPC ............. *F16J 15/3204* (2013.01); *F16F 1/00* (2013.01); *F16J 15/3208* (2013.01); *F16J 15/3212* (2013.01); *F16J 15/3236* (2013.01)

(58) Field of Classification Search
CPC .... F16J 15/3236; F16J 15/006; F16J 15/3216; F16J 15/3208; F16J 15/3232; F16J 15/3204; F16J 15/3212; F16F 1/00
See application file for complete search history.

(56) References Cited

U.S. PATENT DOCUMENTS

| 3,394,939 | A | 7/1968 | Mastro |
| 3,765,690 | A | 10/1973 | Sievenpiper |
| 4,566,702 | A | 1/1986 | Traub |
| 4,893,823 | A | 1/1990 | Strouse et al. |
| 5,163,692 | A | 11/1992 | Schofield et al. |
| 5,326,112 | A | 7/1994 | Paykin |
| 5,979,904 | A | 11/1999 | Balsells |
| 6,712,362 | B2 | 3/2004 | Krappmann et al. |
| 8,096,559 | B2 | 1/2012 | Cook |
| 8,240,672 | B2 * | 8/2012 | Grace .................... F16J 15/166 277/353 |
| 2010/0270491 | A1 * | 10/2010 | Faas ...................... F16J 15/3236 251/366 |
| 2011/0140369 | A1 * | 6/2011 | Lenhert ................ F16J 15/3216 277/589 |
| 2011/0272892 | A1 | 11/2011 | Grace et al. |
| 2012/0286478 | A1 * | 11/2012 | Uesugi ................... F16J 15/166 277/549 |
| 2013/0043661 | A1 * | 2/2013 | Binder ................... F16J 15/322 277/554 |

* cited by examiner

*Primary Examiner* — Kristina Fulton
*Assistant Examiner* — Eugene G Byrd
(74) *Attorney, Agent, or Firm* — Baker & Hostetler LLP; Gregory A. Grissett

(57) ABSTRACT

A high pressure seal assembly includes a seal element that moves in response to an increase in pressure.

12 Claims, 3 Drawing Sheets

HIGH PRESSURE SEAL ASSEMBLY FOR A MOVEABLE SHAFT

TECHNICAL FIELD

The present disclosure relates to sealing, and more particularly to sealing high differential pressure moving shafts, such as shafts used downhole component or tools in oil or gas drilling systems.

BACKGROUND

Sealing around rotating or reciprocating shafts is performed in numerous ways. Sealing moving shafts is difficult in high pressure, dynamic operations, such as at high differential pressures and relatively high shaft rotational speeds typical in drilling operations. In general, the contact stress between the seal and shaft increases with increasing differential pressure. With lip-type seals, as the pressure differential across the seal increases, the differential pressure acts on the unsupported area of the sealing element or lip to create a high force, especially a high radial force, on the stationary sealing element acting against the rotating shaft. At some point, the lip can deform, extrude, or heat up to the point of leakage or failure.

Applications in oil well drilling subjects seals to high differential pressures. For just one example, a turbine in some circumstances operates between 1,000 and 6,000 rpm at differential pressures of approximately 3,000 PSI.

SUMMARY

An embodiment of the present disclosure includes a seal assembly for application to a moveable shaft. The seal assembly having a high pressure side and a low pressure side. The seal assembly includes a seal element including a heel and an elongated sealing leg. The sealing leg has a lip configured to contact the moveable shaft so as to form a seal between the lip and the moveable shaft. An annular cavity is configured to be stationary relative to the moveable shaft and at least a portion of the seal element is located in the cavity. The seal assembly also includes a biasing assembly located in the cavity on a low pressure side of the heel and configured (i) to compress in response to an increase in a pressure differential between the low pressure side and the high pressure side and (i) to expand in response to a decrease in the pressure differential. The seal assembly also includes a support element in contact with the sealing leg such that the sealing leg has a supported portion and a free portion, the free portion defining a length that extends from a location aligned with the support element to the lip of the sealing leg, the length of the free portion of the sealing leg being variable according to changes in the differential pressure, whereby the biasing assembly is compressed in response to an increase in the differential pressure such that the length of the free portion of the sealing leg decreases.

DETAILED DESCRIPTION OF ILLUSTRATIVE EMBODIMENTS

Figure 1:
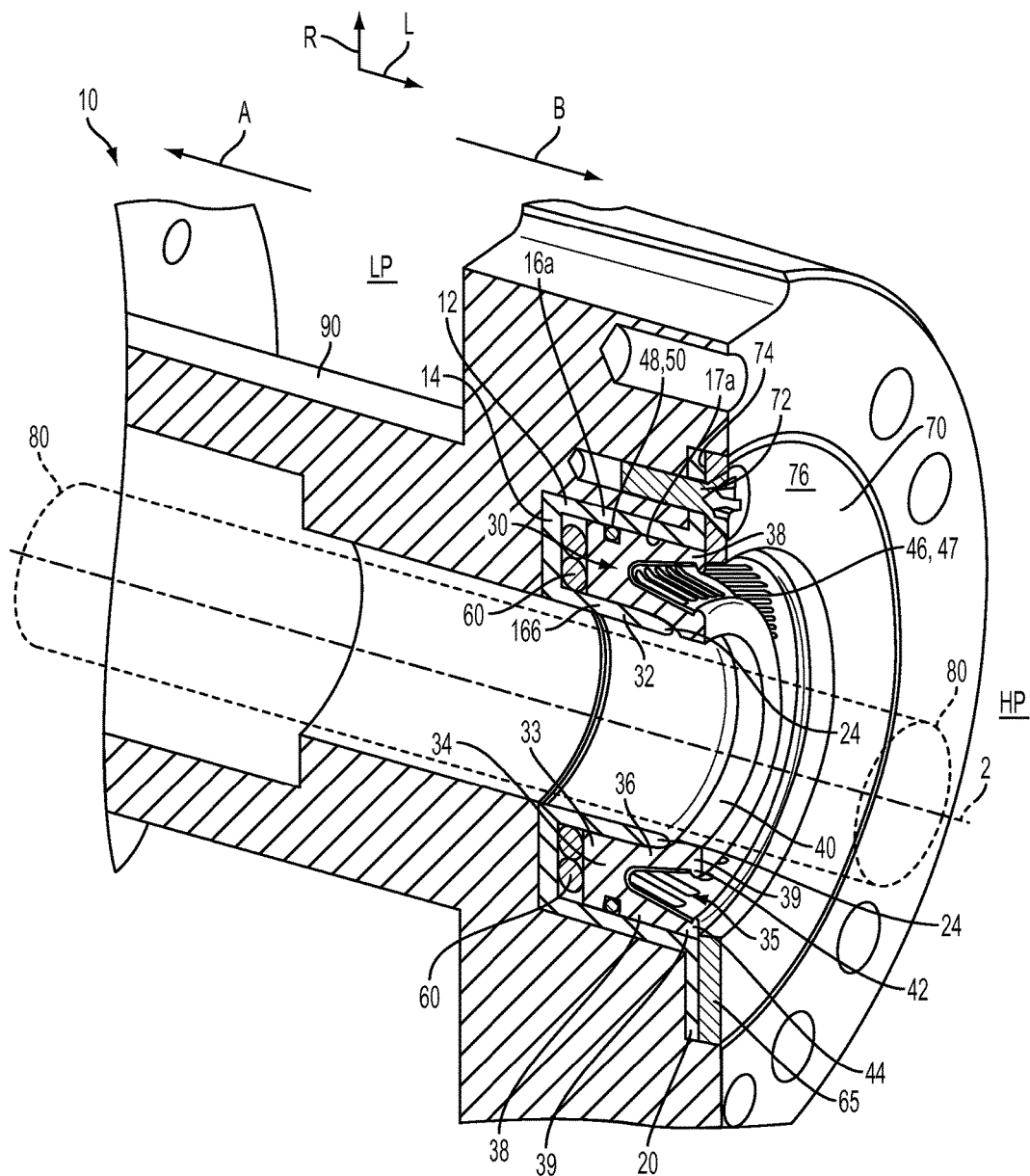
FIG. 1 is a cutaway, perspective view of a first embodiment seal assembly with the shaft shown in dashed lines.
Figure 2:
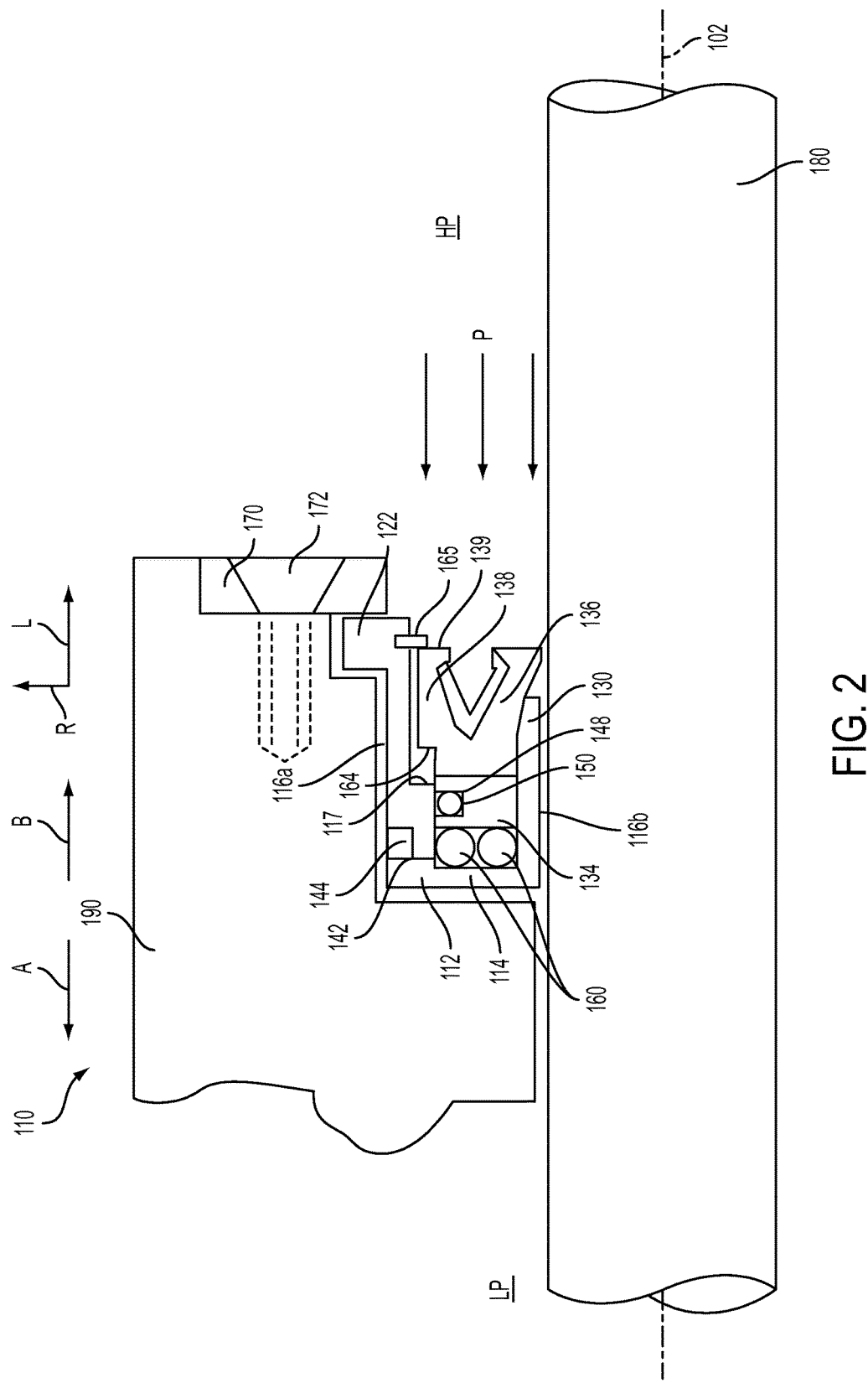
FIG. 2 is partial sectional view of a second embodiment seal assembly illustrating the seal assembly operating at a low or zero pressure differential.
Figure 3:
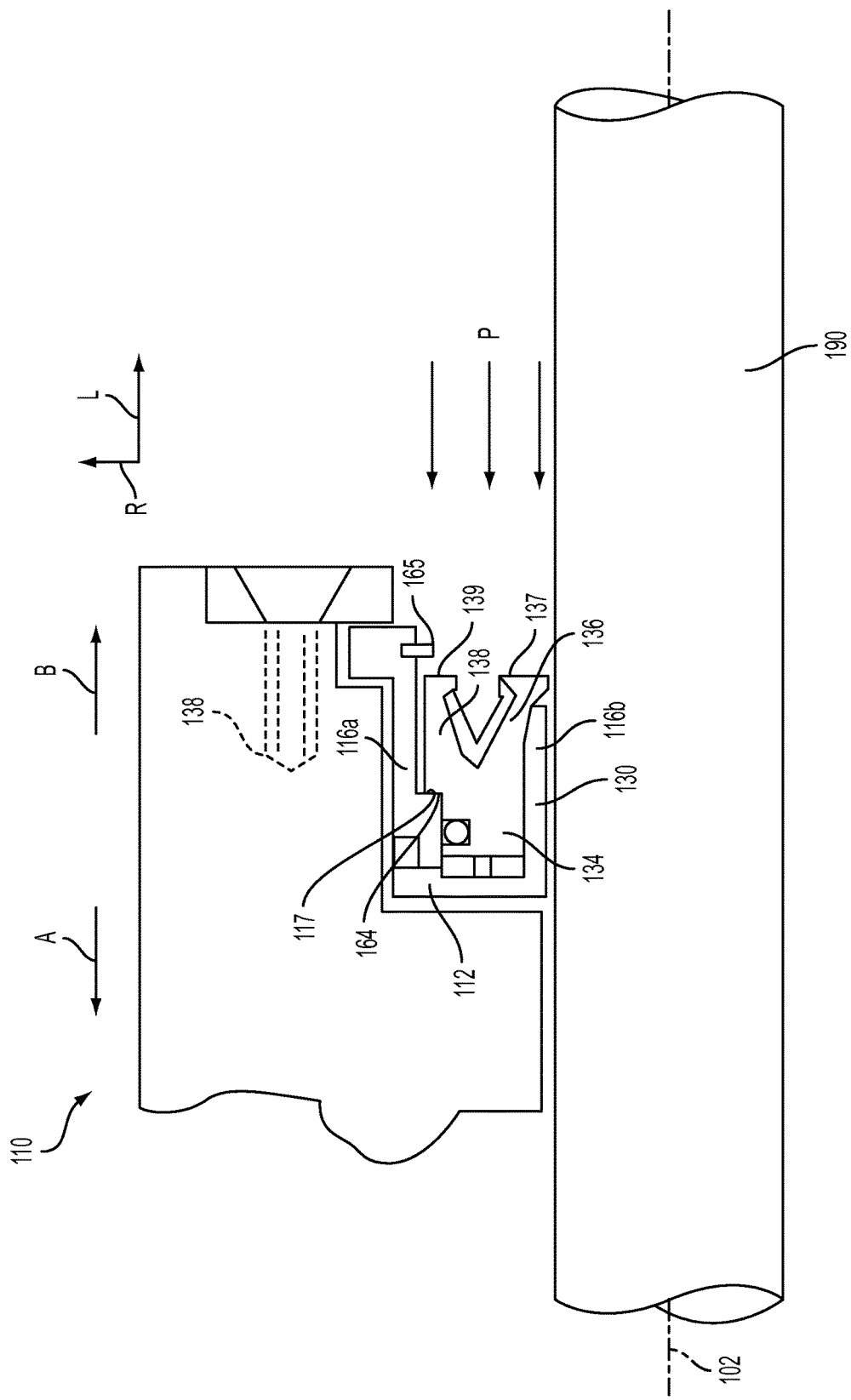
FIG. 3 is partial sectional view of the assembly shown in FIG. 2 illustrating the seal assembly operating at a high pressure differential (some reference numerals are omitted from FIG. 3 for clarity).

Referring to FIG. 1, a seal assembly 10 for sealing around moveable, such as rotating or reciprocating, shaft 80 can include a cartridge insert 12, an actuatable seal element 30, and a retaining ring 70. Seal assembly 10 seals about the shaft 80 (shaft 180 is shown in FIGS. 2 and 3; shaft 80 shown in dashed lines FIG. 1) between LP pressure side and a high pressure side HP spaced relative to the LP pressure side along an axial direction L. The high pressure side HP may be disposed forward relative to the seal assembly 10 and the lower pressure side LP is disposed rearward relative to the seal assembly 10. The seal assembly 10 is configured so that differential pressure acting on the seal assembly 10 causes the seal element 30 to advance in a first or rearward direction A. When differential pressure is below a predetermined value or is at or near zero pressure differential, the seal element 30 is biased back in second or forward direction B that is opposite the first direction A. The first and second directions A and B are each aligned along an axial direction L of the sealing assembly 10.

The seal assembly 10 can include a housing 90, such as a non-rotating structure within a downhole tool of drilling system, through which the shaft 80 extends. Accordingly, the seal assembly 10 and 110 (FIGS. 2 and 3) can be part of one or more drilling system components or tools configured for operation downhole. As such, the downhole tools can be part of or disposed along any portion of a drill string in a drilling system. For merely one example, some downhole installations of a hydraulic rotary steerable tool have a turbine shaft that is powered by drilling mud.

The cartridge insert 12 is an annular structure that includes a radially oriented base 14 and a pair of axial sidewalls 16a and 16b. The base 14 and sidewalls 16a and 16b define a cavity 16c that is open toward high pressure side HP in the second direction B. The assembly can extends along a central axial axis 2 that is aligned with the axial direction L. The sidewalls 16a and 16b may be referred to as an outboard sidewall 16a and an inboard sidewall 16b spaced apart with respect to each other along a radial direction R that is perpendicular to the axial direction L. The outboard sidewall 16a can include an outboard flange 20 that is explained more fully below. The inboard sidewall 16b forms a support element 32 in the shape of a cylinder that terminates at a support rim 24 such that the support rim 24 is spaced from the base 14 in the forward direction B. The cartridge insert 12 can be formed of any material. The terms "inboard" and "outboard" refer to radial directions or orientations such that outboard is spaced away from a central axis 2 and inboard is spaced between an outboard reference point and the central axial axis 2.

The actuatable seal element 30 define a V-shaped body 33 that defines a heel 34 and a pair of legs 36 and 38 that extend outwardly from the heel 34 along the forward direction B. The pair of legs 36 and 38 terminate at respective distal ends 37 and 39. The heel 34 and legs 36 and 38 define V-shaped pocket 35. Seal element 30 is oriented in the cartridge insert 12 so that the V-shaped pocket 35 opens to the high pressure side HP. The pair of legs include a sealing leg 36 and a structural leg 38. Sealing leg 36 is inboard relative to structural leg 38 along the radial direction R.

The sealing leg 36 at its distal end 37 includes an inboard sealing lip 40 for contact with the shaft 80 and a retention lip 42. The structural leg 38 at its distal end 37 defines an additional retention lip 44. As illustrated, the retention lips 42 and 44 each project toward the interior of the V-shaped pocket 35 along the radial direction R. Optionally, a spring, such as leaf spring or v-spring may be positioned within legs 36 and 38 between the lips 40 and 42 in the V-shaped pocket 35 of the seal element 30. Also, radially oriented keys 46 project from, for instance are affixed to, the wall 16b of the cartridge insert 12 and may be inserted into corresponding slots 47 defined by the leg 36 to prevent rotation of seal element 30 within cartridge insert 12. The keys 46 do not have to be affixed to the wall 16b. Rather, the wall 16b can define slots and the seal leg 36 can define keys 46 configured for insertion into the slots 47. Other keys or means for preventing rotation of seal element 30 within insert 12 may be used.

Sealing leg 36 has a portion that is in contact with or supported by support ring 32, which is referred to as the supported portion of sealing leg 36. The portion of sealing leg extending forward of support ring 32, specifically forward of supporting ring rim 24 is referred to as the unsupported portion of the sealing leg 36. The supported portion need not be supported over the entire length of leg 36 that is rearward of support ring rim 24.

A retaining ring 70 configured to secure the cartridge insert 12 to the housing 90 and at least partially retain the seal element 30 in the insert 12. As illustrated, the retaining ring 70 is attached to the housing 90 by bolts 72 or other suitable fasteners. Retaining ring 70 includes an inner surface 74 and an outer surface 76 opposed to the inner surface 74 along the axial direction L. The retraining ring 70 includes an inboard flange or stop 65 that protrudes inwardly past outboard sidewall 16a to cover at least a portion of the end 39 of structural leg 38. As illustrated, a portion of the inner surface 74 defines the stop 65.

A biasing assembly 60 can be located between base 14 of the cartridge insert 12 and heel 34 of seal element 30. In the illustrated embodiment, the biasing assembly 60 includes one or more springs, such as helical springs, wrapped as toroid around the inboard wall 16b. As illustrated, the springs 60 can be extend one revolution around the inboard wall 16b. However, it should be appreciated that the springs can make more than one revolution, such as two or more revolutions around the inboard wall 16b. In alternative embodiments, the biasing assembly 60 can be an compliant element, such as a compressible o-ring, an elastic ring, or like structure, or other spring structure may be used.

In the embodiment shown in FIG. 1, insert cavity 16c has a first or cavity axial dimension that extends from the base 14 and the inside surface 76 of retaining ring 70. The biasing member 60 and seal element 30 can define an at-rest or second axial dimension that may be greater than that the cavity dimension such that that spring assembly 60 is under light compression at zero differential pressure or at the lower range of operational differential pressure. Alternatively, spring assembly 60 may be uncompressed in its as-rest state.

Because the function of the spring assembly 60 uses differential pressure between the higher pressure and low pressure sides HP and LP, a static seal member 50 located axially between heel 34 and the open end of seal element 30 and adjacent to the sidewall 16a. In this regard, seal body 33 includes a circumferential groove 48 on its outboard side (not numbered). The static seal member 50, such as an o-ring, is located in groove 48 and is in contact with the outboard sidewall 16a. Because seal body 33 is stationary relative to an inboard surface 17a of outboard sidewall 16a, the static seal member 50 seals between static (that is, no relative rotation) surfaces.

FIGS. 2 and 3 illustrate a second embodiment of a seal assembly 110. Seal assembly 110 includes a cartridge insert 112 that is an annular structure that includes a radially oriented base 114 and a pair of axial sidewalls 116a and 116b that extend from the base 114 in the forward direction B. The base 114 and sidewalls 116a and 116b form a cavity (not numbered) that opens toward high pressure side HP along the forward direction B. Outboard sidewall 116a preferably includes an outboard flange 122, an inboard shoulder or stop 117, a groove 142, and a static seal member 144 located in the groove 142 configured to seal against an outboard surface (not numbered) of the insert 112 against a stationary portion of housing 190 as will be further detailed below. Inboard sidewall 116b similar to first embodiment sidewall 16b described above.

The seal 130 includes a body 132 that defines a heel 124 and a pair of legs that extend outwardly from the body opposite heel 124 in the forward direction B to define a V-shaped pocket (not numbered). Seal 130 is oriented so that the V-shaped pocket opens to the high pressure side HP, although this orientation is not necessary. The legs include a sealing leg 136 and a structural leg 138.

The sealing leg 136 is as described for first embodiment sealing leg 36. Other aspects of seal body 132 and structural leg 138 are as described for first embodiment body 33 and structural leg 38. A circumferential groove 148 and static seal member 150 are located at the low pressure side LP of the stop 117 as will be described below. The seal body 132 defines a shoulder 164 located on an outboard side (not numbered) thereof such that the shoulder 164 and stop 117 face each other and are capable of contact, as described below.

A retaining ring 170 is configured to secure the insert 112 and at least a portion of the seal 130 to the housing 190. As illustrated, the retaining ring 170 is attached to housing 190 by bolts 172 or other suitable fasteners. Retaining ring 170 includes a ring or stop 165 that retains the insert flange 122 against housing. A biasing member 160, such as a spring, is located between base 114 of insert 112 and the heel 124 of seal 130. Biasing member 160 and its relationship to other parts is as described for first embodiment spring assembly 60.

In the embodiment shown in FIGS. 2 and 3, each one of seal 130 and biasing members 160 may be under slight axial compression at zero differential pressure or at the lower range of operational differential pressure.

Because the spring relies on differential pressure for its function, the seal assembly 110 includes at least two sealing elements 150 and 144. The first static seal member 150 is located axially between heel 124 and the open end of seal 130. In this regard, seal body 132 includes the circumferential groove 148 on its outboard side (not numbered). The static seal member 150, such as O-ring 150, is located in groove 148 and is configured to define seal against the outboard sidewall 116a. Because seal body 132 is stationary relative to an inboard surface (not numbered) of outboard sidewall 116a, the static seal member 150 seals between static (that is, no relative rotation) surfaces. The second static seal member 144 is located between the outer sidewall 116a of the cartridge insert 112 and an inner surface (not numbered) of housing 190. Accordingly, seals 144 and 150 seal the lower pressure side LP of cartridge 112 from the high pressure.

The following description of the function and operation of seal 10, 110 applies to each embodiment of the seal assembly unless specifically stated otherwise. The seal assembly 10, 110 is configured to, in response to differential pressure acting against the seal assembly 10, 110, actuate the seal element 30, 130 from an at-rest or initial configuration as shown in FIG. 2, to an actuated configuration as shown in FIG. 3. As shown in FIG. 2, the seal assembly 10, 100 in the initial configuration is at its at-rest or zero or low-differential pressure state. The terminal end 139 (that is, located on the high-pressure side, which is to the right as oriented in FIG. 2) of structural leg 138 is in contact with stop 165, the biasing member 160 is under no or minimum compression, and the shoulder 164 is spaced apart from stop 117 to define a gap (not numbered) therebetween. In the initial configuration, seal assembly 10, 110 be configured to be operational to form a seal between sealing leg 136 and shaft 180. Alternatively, seal assembly 10, 110 may be configured to form an effective seal only upon the application of a differential pressure and when the seal element 30,130 is actuated into the actuated configuration.

Upon application of a differential pressure or an increase in differential pressure, as illustrated in FIG. 3, the seal element 30,130 has transitioned into the actuated configuration. As shown, the seal body 32,132 has moved in rearward direction A in response to the differential pressure acting on the seal assembly 10, 110 between high pressure side HP and low pressure side LP. In this regard, upon the change in pressure, cartridge insert 12,112 preferably remains stationary while the axial, rearward force pushes seal body 32,132 in the rearward direction A (or leftward in FIG. 3), thereby compressing spring assembly 60,160, and moving structural leg 38,138 away from stop 65,165. As shown in FIG. 3, seal body 32,132 is in its fully actuated position in which the seal element 30, 132 has moved fully to rearward such that shoulder 164 contacts stop 117 of the cartridge insert 112. A comparison of FIGS. 2 and 3 shows a gap (not numbered) between elements 164 and 117 in FIG. 2 and contact between elements 164 and 117 in FIG. 3.

The effect of the rearward movement of the seal element 30, 130 relative to cartridge insert 12, 112 is to move sealing leg 36, 136 in the rearward direction A relative to support ring 32, 132, which shortens the portion of sealing leg 36,136 that extends past the lip 40, 140. Because the area of the unsupported portion of sealing leg 36, 136 (that is unsupported from radially inward forces) is diminished at a higher pressure because of the rearward movement described above, the radial sealing force resulting from the pressure on leg 36, 136 can remain approximately equal upon an increase in differential pressure, or the radial sealing force can increase but not past a functional limit of sealing pressure. The result is that at least the upper limit of sealing pressure at which the seal element 30 functions is extended.

The present disclosure is described as sealing about a movable, e.g., a rotating or a reciprocating shaft. The phrases "moveable shaft," "rotating shaft," and "reciprocating shaft," or refers to relative movement of the shaft relative to the seal assembly. Accordingly, the phrase "moveable shaft," "rotating shaft," and "reciprocating shaft," encompasses a seal assembly that moves about a stationary shaft. Further, the present disclosure is illustrated by two embodiments, and the present disclosure is not intended to be limited to the particular embodiments. Rather, the plain meaning of the words of the claims define the scope of the invention.

What is claimed:

1. A high pressure seal assembly for application to a moveable shaft, the seal assembly having a high pressure side and a low pressure side opposite the high pressure side along an axial direction, the seal assembly comprising:
   a seal element including a heel and an elongated sealing leg that extends from the heel along the axial direction toward the high pressure side, the sealing leg having a lip configured to contact the moveable shaft so as to form a seal between the lip and the moveable shaft, the lip defining a terminal end;
   a cartridge insert including a base and a support element that extends from the base along the axial direction toward the high pressure side, the base and the support element defining an annular cavity, the cartridge insert configured to be stationary relative to the moveable shaft, and at least a portion of the seal element is located in the annular cavity such that the support element is in contact with the sealing leg; and
   a biasing assembly located in the annular cavity between the seal element and the base of the cartridge insert such that the heel of the seal element and the base of the cartridge insert are both in contact with the biasing assembly, the biasing assembly configured (i) to compress in response to an increase in a pressure differential between the low pressure side and the high pressure side and (ii) to expand in response to a decrease in the pressure differential,
   wherein the sealing leg of the seal element has a supported portion that is in contact with the support element, and a free portion that extends from the supported portion along the axial direction, the free portion defining a length that extends from a location aligned with the support element to the terminal end of the lip of the sealing leg, the length of the free portion of the sealing leg being variable according to changes in the pressure differential,
   whereby compression of the biasing assembly in response to an increase in the pressure differential moves the sealing element along the axial direction so as to decrease the length of the free portion of the sealing leg.

2. The high pressure seal assembly of claim 1 wherein the seal element includes the sealing leg and a structural leg, the sealing and structural legs defining a V-shaped pocket that is open toward the high pressure side.

3. The high pressure seal assembly of claim 2 wherein the support element is a support ring that extends from the base along the axial direction toward the high pressure side.

4. The high pressure seal assembly of claim 1 wherein the biasing assembly is one or more wound helical springs.

5. The high pressure seal assembly of claim 1 wherein the biasing assembly is one or more elastic rings.

6. The high pressure seal assembly of claim 2 further comprising a V-spring located in the V-shaped pocket, the V-spring biasing the sealing leg toward the moveable shaft.

7. The high pressure seal assembly of claim 2 further comprising a retaining ring that retains the seal element in position in the annular cavity of the cartridge insert, the retaining ring in contact with an end of the structural leg.

8. The high pressure seal assembly of claim 7 wherein the cartridge insert includes a flange that is retained by the retaining ring.

9. The high pressure seal assembly of claim 2 wherein the sealing leg and the structural leg each extend at least partially along the axial direction toward the high pressure side.

10. The high pressure seal assembly of claim 1 wherein the seal element is moveable in the axial direction in response to the increase in the pressure differential between the low pressure side and the high pressure side.

11. The high pressure seal assembly of claim 1 wherein the pressure differential is between about 1 psi to about 4,000 psi.

12. The high pressure seal assembly of claim 1, wherein the cartridge insert has a first outboard sidewall coupled to the base and a second inboard sidewall coupled to the base, the second inboard wall being spaced from the first outboard sidewall in the radial direction, such that the base, the first outboard sidewall, and the second inboard sidewall define the annular cavity, wherein the second inboard sidewall includes the support element.

* * * * *